United States Patent
Howe et al.

(10) Patent No.: US 9,633,356 B2
(45) Date of Patent: Apr. 25, 2017

(54) TARGETED ADVERTISING FOR PLAYLISTS BASED UPON SEARCH QUERIES

(75) Inventors: Karen N. Howe, Sammamish, WA (US); Jennifer L. Kolar, Seattle, WA (US); Srinivasan Sudanagunta, Seattle, WA (US)

(73) Assignee: AOL Inc., Dulles, VA (US)

( * ) Notice: Subject to any disclaimer, the term of this patent is extended or adjusted under 35 U.S.C. 154(b) by 2691 days.

(21) Appl. No.: 11/491,502

(22) Filed: Jul. 20, 2006

(65) Prior Publication Data
US 2008/0033806 A1  Feb. 7, 2008

(51) Int. Cl.
*G06Q 30/00*  (2012.01)
*G06Q 30/02*  (2012.01)

(52) U.S. Cl.
CPC ......... *G06Q 30/02* (2013.01); *G06Q 30/0256* (2013.01); *G06Q 30/0272* (2013.01)

(58) Field of Classification Search
CPC . G06Q 30/02; G06Q 30/0256; G06Q 30/0272
USPC ...................................... 705/1–28
See application file for complete search history.

(56) References Cited

U.S. PATENT DOCUMENTS

| | | |
|---|---|---|
| 5,241,305 A | 8/1993 | Fascenda et al. |
| 5,339,434 A | 8/1994 | Rusis |
| 5,345,227 A | 9/1994 | Fascenda et al. |
| 5,467,471 A | 11/1995 | Bader |
| 5,483,522 A | 1/1996 | Derby et al. |
| 5,491,511 A | 2/1996 | Odle |
| 5,600,364 A | 2/1997 | Hendricks et al. |
| 5,616,876 A | 4/1997 | Cluts |
| 5,633,683 A | 5/1997 | Rosengren et al. |
| 5,634,064 A | 5/1997 | Warnock et al. |

(Continued)

FOREIGN PATENT DOCUMENTS

| | | |
|---|---|---|
| CN | 1471669 | 1/2004 |
| EP | 0867003 | 9/1998 |

(Continued)

OTHER PUBLICATIONS

"Hiwire Ad Serving," Hiwire, 2002. <http://www.archive.org/web/20030212061101/hiwire.com/products/ad_serving.html> Accessed Apr. 25, 2006, 1 pages.

(Continued)

*Primary Examiner* — William A Brandenburg
(74) *Attorney, Agent, or Firm* — Finnegan, Henderson, Farabow, Garrett & Dunner, L.L.P.

(57) ABSTRACT

A facility for selecting targeted advertising messages for presentation with sets of media sequences forming playlists is described. The facility stores search queries that are used by a user to locate pre-existing playlists, to generate new playlists, or to modify existing playlists. Prior to the use of a stored playlist, or contemporaneously with the use of a stored playlist, the facility uses the stored search queries to select one or more advertising messages to be presented with the media sequences in the playlist. The advertising messages that are presented may be updated each time the playlist is accessed in order to remove advertising messages from expired campaigns, to remove advertising messages that are not having a desired marketing effect, or to add new advertising messages.

36 Claims, 8 Drawing Sheets

(56) References Cited

U.S. PATENT DOCUMENTS

| | | |
|---|---|---|
| 5,680,323 A | 10/1997 | Barnard |
| 5,684,999 A | 11/1997 | Okamoto |
| 5,721,827 A | 2/1998 | Logan et al. |
| 5,737,619 A | 4/1998 | Judson |
| 5,761,436 A | 6/1998 | Nielsen |
| 5,802,361 A | 9/1998 | Wang et al. |
| 5,870,755 A | 2/1999 | Stevens et al. |
| 5,875,332 A | 2/1999 | Wang et al. |
| 5,892,919 A | 4/1999 | Nielsen |
| 5,895,471 A | 4/1999 | King et al. |
| 5,907,837 A | 5/1999 | Ferrel et al. |
| 5,915,001 A | 6/1999 | Uppaluru |
| 5,917,424 A | 6/1999 | Goldman et al. |
| 5,918,232 A | 6/1999 | Pouschine et al. |
| 5,920,854 A | 7/1999 | Kirsch et al. |
| 5,920,856 A | 7/1999 | Syeda-Mahmood |
| 5,920,859 A | 7/1999 | Li |
| 5,924,116 A | 7/1999 | Aggarwal et al. |
| 5,930,783 A | 7/1999 | Li et al. |
| 5,933,811 A | 8/1999 | Angles et al. |
| 5,935,210 A | 8/1999 | Stark |
| 5,941,944 A | 8/1999 | Messerly |
| 5,946,697 A | 8/1999 | Shen |
| 5,953,718 A | 9/1999 | Wical |
| 5,956,484 A | 9/1999 | Rosenberg et al. |
| 5,956,722 A | 9/1999 | Jacobson et al. |
| 5,963,940 A | 10/1999 | Liddy et al. |
| 5,974,409 A | 10/1999 | Sanu et al. |
| 5,983,218 A | 11/1999 | Syeda-Mahmood |
| 5,983,237 A | 11/1999 | Jain et al. |
| 5,987,466 A | 11/1999 | Greer et al. |
| 5,991,374 A | 11/1999 | Hazenfield |
| 5,991,756 A | 11/1999 | Wu |
| 5,991,809 A | 11/1999 | Kriegsman |
| 5,995,921 A | 11/1999 | Richards et al. |
| 5,999,664 A | 12/1999 | Mahoney et al. |
| 5,999,940 A | 12/1999 | Ranger |
| 6,006,225 A | 12/1999 | Bowman et al. |
| 6,006,242 A | 12/1999 | Poole et al. |
| 6,006,264 A | 12/1999 | Colby et al. |
| 6,009,271 A | 12/1999 | Whatley |
| 6,009,410 A | 12/1999 | LeMole et al. |
| 6,012,126 A | 1/2000 | Aggarwal et al. |
| 6,018,619 A | 1/2000 | Allard et al. |
| 6,018,768 A | 1/2000 | Ullman et al. |
| 6,026,391 A | 2/2000 | Osborn et al. |
| 6,026,413 A | 2/2000 | Challenger et al. |
| 6,029,165 A | 2/2000 | Gable |
| 6,035,330 A | 3/2000 | Astiz et al. |
| 6,038,561 A | 3/2000 | Snyder et al. |
| 6,038,610 A | 3/2000 | Belfiore et al. |
| 6,044,375 A | 3/2000 | Shmueli et al. |
| 6,055,543 A | 4/2000 | Christensen et al. |
| 6,061,692 A | 5/2000 | Thomas et al. |
| 6,065,058 A | 5/2000 | Hailpern et al. |
| 6,067,552 A | 5/2000 | Yu |
| 6,067,565 A | 5/2000 | Horvitz |
| 6,069,669 A | 5/2000 | Park et al. |
| 6,078,916 A | 6/2000 | Culliss |
| 6,081,774 A | 6/2000 | De Hita et al. |
| 6,092,072 A | 7/2000 | Guha et al. |
| 6,092,100 A | 7/2000 | Berstis et al. |
| 6,092,118 A | 7/2000 | Tsang |
| 6,094,684 A | 7/2000 | Pallmann |
| 6,098,064 A | 8/2000 | Pirolli et al. |
| 6,112,202 A | 8/2000 | Kleinberg |
| 6,112,203 A | 8/2000 | Bharat et al. |
| 6,121,963 A | 9/2000 | Ange et al. |
| 6,128,627 A | 10/2000 | Mattis et al. |
| 6,131,095 A | 10/2000 | Low et al. |
| 6,134,548 A | 10/2000 | Gottsman et al. |
| 6,138,113 A | 10/2000 | Dean et al. |
| 6,138,162 A | 10/2000 | Pistriotto et al. |
| 6,151,584 A | 11/2000 | Papierniak et al. |
| 6,157,924 A | 12/2000 | Austin |
| 6,163,778 A | 12/2000 | Fogg et al. |
| 6,173,287 B1 | 1/2001 | Eberman et al. |
| 6,175,829 B1 | 1/2001 | Li et al. |
| 6,175,830 B1 | 1/2001 | Maynard |
| 6,177,931 B1 | 1/2001 | Alexander et al. |
| 6,178,439 B1 | 1/2001 | Feit |
| 6,181,336 B1 | 1/2001 | Chiu et al. |
| 6,192,382 B1 | 2/2001 | Lafer et al. |
| 6,208,988 B1 | 3/2001 | Schultz |
| 6,211,871 B1 | 4/2001 | Himmel et al. |
| 6,223,178 B1 | 4/2001 | Himmel et al. |
| 6,225,995 B1 | 5/2001 | Jacobs et al. |
| 6,240,416 B1 | 5/2001 | Immon et al. |
| 6,249,844 B1 | 6/2001 | Schloss et al. |
| 6,251,016 B1 | 6/2001 | Tsuda et al. |
| 6,253,204 B1 | 6/2001 | Glass et al. |
| 6,256,032 B1 | 7/2001 | Hugh |
| 6,256,623 B1 | 7/2001 | Jones |
| 6,262,724 B1 | 7/2001 | Crow et al. |
| 6,267,676 B1 | 7/2001 | Nagaoka |
| 6,272,505 B1 | 8/2001 | De La Huerga |
| 6,275,820 B1 | 8/2001 | Navin-Chandra et al. |
| 6,282,548 B1 | 8/2001 | Burner et al. |
| 6,282,549 B1 | 8/2001 | Hoffert et al. |
| 6,310,601 B1 | 10/2001 | Moore et al. |
| 6,314,456 B1 | 11/2001 | Van Andel et al. |
| 6,321,200 B1 | 11/2001 | Casey |
| 6,324,536 B1 | 11/2001 | Rofrano |
| 6,327,574 B1 | 12/2001 | Kramer et al. |
| 6,330,593 B1 | 12/2001 | Roberts et al. |
| 6,351,755 B1 | 2/2002 | Najork et al. |
| 6,374,260 B1 | 4/2002 | Hoffert et al. |
| 6,377,995 B2 | 4/2002 | Agraharam et al. |
| 6,389,467 B1 | 5/2002 | Eyal |
| 6,393,415 B1 | 5/2002 | Getchius et al. |
| 6,411,724 B1 | 6/2002 | Vaithilingam et al. |
| 6,411,952 B1 | 6/2002 | Bharat et al. |
| 6,418,441 B1 | 7/2002 | Call |
| 6,421,675 B1 | 7/2002 | Ryan et al. |
| 6,424,966 B1 | 7/2002 | Meyerzon et al. |
| 6,434,573 B1 | 8/2002 | Jacobson et al. |
| 6,438,539 B1 | 8/2002 | Korolev et al. |
| 6,446,083 B1 | 9/2002 | Leight et al. |
| 6,449,627 B1 | 9/2002 | Baer et al. |
| 6,470,307 B1 | 10/2002 | Turney et al. |
| 6,484,199 B2 | 11/2002 | Eyal |
| 6,486,891 B1 | 11/2002 | Rice |
| 6,490,585 B1 | 12/2002 | Hanson et al. |
| 6,493,720 B1 | 12/2002 | Chu et al. |
| 6,498,897 B1 | 12/2002 | Nelson et al. |
| 6,516,337 B1 | 2/2003 | Tripp et al. |
| 6,519,564 B1 | 2/2003 | Hoffberg et al. |
| 6,519,603 B1 | 2/2003 | Bays et al. |
| 6,519,648 B1 | 2/2003 | Eyal |
| 6,523,000 B1 | 2/2003 | Ando et al. |
| 6,539,382 B1 | 3/2003 | Byrne et al. |
| 6,547,829 B1 | 4/2003 | Meyerzon et al. |
| 6,549,922 B1 | 4/2003 | Srivastava et al. |
| 6,556,983 B1 | 4/2003 | Altschuler et al. |
| 6,567,800 B1 | 5/2003 | Barrera et al. |
| 6,584,468 B1 | 6/2003 | Gabriel et al. |
| 6,587,127 B1 | 7/2003 | Leeke et al. |
| 6,587,547 B1 | 7/2003 | Zimgibl et al. |
| 6,594,662 B1 | 7/2003 | Sieffert et al. |
| 6,594,694 B1 | 7/2003 | Najork et al. |
| 6,598,051 B1 | 7/2003 | Wiener et al. |
| 6,605,120 B1 | 8/2003 | Fields et al. |
| 6,606,639 B2 | 8/2003 | Jacobsen et al. |
| 6,638,317 B2 | 10/2003 | Nakao et al. |
| 6,643,661 B2 | 11/2003 | Polizzi et al. |
| 6,651,058 B1 | 11/2003 | Sundaresan et al. |
| 6,654,749 B1 | 11/2003 | Nashed |
| 6,658,402 B1 | 12/2003 | Dutta |
| 6,675,174 B1 | 1/2004 | Bolle et al. |
| 6,681,227 B1 | 1/2004 | Kojima et al. |
| 6,701,355 B1 * | 3/2004 | Brandt .................. G06Q 30/02 709/219 |
| 6,708,176 B2 * | 3/2004 | Strunk ............... G06Q 30/0254 |
| 6,711,590 B1 | 3/2004 | Lennon et al. |

(56) References Cited

U.S. PATENT DOCUMENTS

| | | |
|---|---|---|
| 6,718,328 B1 | 4/2004 | Norris |
| 6,718,365 B1 | 4/2004 | Dutta |
| 6,718,551 B1 | 4/2004 | Swix et al. |
| 6,728,767 B1 | 4/2004 | Day et al. |
| 6,760,721 B1 | 7/2004 | Chasen et al. |
| 6,760,916 B2 | 7/2004 | Holtz et al. |
| 6,782,391 B1 | 8/2004 | Scher |
| 6,782,427 B1 | 8/2004 | Van Andel et al. |
| 6,785,688 B2 | 8/2004 | Abajian et al. |
| 6,816,858 B1 | 11/2004 | Coden et al. |
| 6,819,339 B1 | 11/2004 | Dowling |
| 6,839,903 B1 | 1/2005 | Shintani |
| 6,842,761 B2 | 1/2005 | Diamond et al. |
| 6,847,977 B2 | 1/2005 | Abajian |
| 6,859,213 B1 | 2/2005 | Carter |
| 6,865,593 B1 | 3/2005 | Reshef et al. |
| 6,877,002 B2 | 4/2005 | Prince |
| 6,895,402 B1 | 5/2005 | Emens et al. |
| 6,911,998 B2 | 6/2005 | Wiseman |
| 6,931,397 B1 | 8/2005 | Sundaresan |
| 6,938,034 B1 | 8/2005 | Kraft et al. |
| 6,941,300 B2 | 9/2005 | Jensen-Grey |
| 6,959,326 B1 | 10/2005 | Day et al. |
| 6,961,714 B1 | 11/2005 | LeVine |
| 6,981,002 B2 | 12/2005 | Nunez |
| 6,983,324 B1 | 1/2006 | Block et al. |
| 6,990,630 B2 | 1/2006 | Landsman et al. |
| 7,000,242 B1 | 2/2006 | Haber |
| 7,080,064 B2 | 7/2006 | Sundaresan |
| 7,080,321 B2 | 7/2006 | Aleksander et al. |
| 7,103,605 B1 | 9/2006 | Hazi et al. |
| 7,162,691 B1 | 1/2007 | Chatterjee et al. |
| 7,181,438 B1 | 2/2007 | Szabo |
| 7,181,444 B2 | 2/2007 | Porter et al. |
| 7,185,003 B2 | 2/2007 | Bayliss et al. |
| 7,209,571 B2 | 4/2007 | Davis et al. |
| 7,222,163 B1 | 5/2007 | Girouard et al. |
| 7,228,305 B1 | 6/2007 | Eyal et al. |
| 7,240,100 B1 | 7/2007 | Wein et al. |
| 7,281,034 B1 | 10/2007 | Eyal |
| 7,340,533 B2 | 3/2008 | Murtza et al. |
| 7,346,512 B2 | 3/2008 | Li-Chun Wang et al. |
| 7,353,246 B1 | 4/2008 | Rosen et al. |
| 7,450,734 B2 | 11/2008 | Rodriguez et al. |
| 7,500,007 B2 | 3/2009 | Ikezoye et al. |
| 7,543,024 B2 | 6/2009 | Holstege |
| 7,630,986 B1 | 12/2009 | Herz et al. |
| 7,720,836 B2 | 5/2010 | Abajian et al. |
| 7,752,186 B2 | 7/2010 | Abajian et al. |
| 7,849,160 B2 | 12/2010 | Hayward |
| 8,095,529 B2 | 1/2012 | Diamond et al. |
| 8,122,236 B2 | 2/2012 | Hayward |
| 8,209,311 B2 | 6/2012 | Abajian et al. |
| 8,209,635 B2 | 6/2012 | Thom |
| 2001/0044719 A1 | 11/2001 | Casey |
| 2001/0044795 A1 | 11/2001 | Cohen et al. |
| 2001/0049824 A1 | 12/2001 | Baker et al. |
| 2001/0054001 A1 | 12/2001 | Robinson |
| 2002/0002541 A1 | 1/2002 | Williams |
| 2002/0004733 A1 | 1/2002 | Addante |
| 2002/0010798 A1 | 1/2002 | Ben-Shaul et al. |
| 2002/0013897 A1 | 1/2002 | McTernan et al. |
| 2002/0024532 A1 | 2/2002 | Fables et al. |
| 2002/0032906 A1 | 3/2002 | Grossman |
| 2002/0035573 A1 | 3/2002 | Black et al. |
| 2002/0049738 A1 | 4/2002 | Epstein |
| 2002/0052928 A1 | 5/2002 | Stern et al. |
| 2002/0053078 A1 | 5/2002 | Holtz et al. |
| 2002/0059184 A1 | 5/2002 | Lian et al. |
| 2002/0065947 A1 | 5/2002 | Wishoff et al. |
| 2002/0069105 A1 | 6/2002 | do Rosario Botelho et al. |
| 2002/0073115 A1 | 6/2002 | Davis |
| 2002/0078003 A1 | 6/2002 | Krysiak et al. |
| 2002/0078014 A1 | 6/2002 | Pallmann |
| 2002/0078441 A1 | 6/2002 | Drake et al. |
| 2002/0082901 A1 | 6/2002 | Dunning et al. |
| 2002/0083469 A1 | 6/2002 | Jeannin et al. |
| 2002/0099694 A1 | 7/2002 | Diamond et al. |
| 2002/0099700 A1 | 7/2002 | Li |
| 2002/0099723 A1 | 7/2002 | Garcia-Chiesa |
| 2002/0099731 A1 | 7/2002 | Abajian |
| 2002/0103920 A1 | 8/2002 | Berkun et al. |
| 2002/0104096 A1 | 8/2002 | Cramer et al. |
| 2002/0120501 A1 | 8/2002 | Bell et al. |
| 2002/0138467 A1 | 9/2002 | Jacobson et al. |
| 2002/0138649 A1 | 9/2002 | Cartmell et al. |
| 2002/0143916 A1 | 10/2002 | Mendiola et al. |
| 2002/0152267 A1 | 10/2002 | Lennon |
| 2002/0174147 A1 | 11/2002 | Wang et al. |
| 2003/0018607 A1 | 1/2003 | Lennon et al. |
| 2003/0028654 A1 | 2/2003 | Abjanic et al. |
| 2003/0088613 A1* | 5/2003 | Goldschmidt Iki ............. H04N 5/44543 709/202 |
| 2003/0149975 A1* | 8/2003 | Eldering ............. H04N 7/17318 725/34 |
| 2004/0015398 A1 | 1/2004 | Hayward |
| 2004/0015703 A1 | 1/2004 | Madison et al. |
| 2004/0025180 A1* | 2/2004 | Begeja ............. G06F 17/30017 725/46 |
| 2004/0030681 A1 | 2/2004 | Shannon et al. |
| 2004/0030683 A1 | 2/2004 | Evans et al. |
| 2004/0045040 A1 | 3/2004 | Hayward |
| 2004/0051812 A1 | 3/2004 | Hayward |
| 2004/0059632 A1 | 3/2004 | Kang et al. |
| 2004/0064476 A1* | 4/2004 | Rounds ............. G06F 17/30017 |
| 2004/0064500 A1 | 4/2004 | Kolar et al. |
| 2004/0088328 A1 | 5/2004 | Cook et al. |
| 2004/0139047 A1* | 7/2004 | Rechsteiner ......... G11B 27/034 |
| 2004/0163101 A1* | 8/2004 | Swix ..................... G06Q 30/02 725/9 |
| 2005/0038809 A1 | 2/2005 | Abajian et al. |
| 2005/0060742 A1* | 3/2005 | Riedl ..................... G06Q 30/02 725/34 |
| 2005/0086345 A1 | 4/2005 | Philyaw et al. |
| 2005/0177568 A1 | 8/2005 | Diamond et al. |
| 2005/0187965 A1 | 8/2005 | Abajian |
| 2005/0193014 A1 | 9/2005 | Prince |
| 2006/0031257 A1 | 2/2006 | Lipscomb et al. |
| 2006/0053109 A1 | 3/2006 | Sudanagunta et al. |
| 2006/0277175 A1 | 12/2006 | Jiang et al. |
| 2007/0116425 A1 | 5/2007 | Hatanaka et al. |
| 2007/0130131 A1 | 6/2007 | Porter et al. |
| 2007/0250560 A1 | 10/2007 | Wein et al. |
| 2008/0133701 A1* | 6/2008 | Kazmi ..................... G06F 21/10 709/217 |
| 2010/0287159 A1 | 11/2010 | Abajian et al. |
| 2011/0055026 A1 | 3/2011 | Hayward et al. |
| 2011/0246866 A1 | 10/2011 | Abajian et al. |
| 2012/0215599 A1 | 8/2012 | Hayward et al. |

FOREIGN PATENT DOCUMENTS

| | | |
|---|---|---|
| JP | 11-112562 | 4/1999 |
| JP | 2000-059326 | 2/2000 |
| JP | 2000-137667 | 5/2000 |
| JP | 2000-515692 | 11/2000 |
| KR | 2000-0037022 | 7/2000 |
| KR | 2000-0050151 | 8/2000 |
| WO | WO-97/22201 | 6/1997 |
| WO | WO-9722069 | 6/1997 |
| WO | WO-00/43914 | 7/2000 |
| WO | WO-00/48057 | 8/2000 |
| WO | WO-0068839 | 11/2000 |
| WO | WO-0133428 | 5/2001 |
| WO | WO-02/056578 | 7/2002 |
| WO | WO-02/057934 | 7/2002 |

OTHER PUBLICATIONS

Parker, Pamela. "Hiwire Unveils Targeted Ad Network for Streaming Media," ClickZ Internet Advertising News, May 16, 2000.

(56) References Cited

OTHER PUBLICATIONS

<http://www.clickz.com/news/print.php/363911> Access Apr. 25, 2006, 1 page.
Top, Derek. "Turning the Tables with Targeted Ad Insertion," streamingmedia.com, Mar. 21, 2001. <http://www.streamingmedia.com/r/printerfriendly.asp?id=6983> Accessed on Apr. 25, 2006, 8 pages.
Wrede, David. "Advertising Solutions: Client-Side Playlist Ad Insertion," Microsoft Windows Media Worldwide, Microsoft Corporation, Dec. 2004. <http://www.microsoft.com/windows/windowsmedia/howto/articles/ad.aspx#ad_topic5> Accessed Apr. 25, 2006, 6 pages.
Bowman et al., "The Harvest Information Discovery and Access System," Computer Networks and ISDN Systems, North Holland Publishing, vol. 28, No. 1, pp. 119-125, Dec. 1995.
European Supplemental Search Report; European Patent Application No. 01 988 143.2; filed Nov. 20, 2001; Applicant: Thomas Licensing S.A., mailed Dec. 28, 2004 (2 pages).
European Supplemental Search Report; European Patent Application No. 01 988 150.7; filed Nov. 20, 2001; Applicant: Thomas Licensing S.A., mailed Dec. 28, 2004 (3 pages).
Fiedler et al., "Using the Web Efficiently: Mobile Crawlers," 17th Annual International Conference of the Association of Management on Computer Science, pp. 324-329, Aug. 1999.
International Search Report; International Patent Application No. PCT/US01/43305; filed Nov. 20, 2001; Applicants: Kolar et al.; mailed Sep. 9, 2002 (2 pages).
International Search Report; International Patent Application No. PCT/US01/43247; filed Nov. 20, 2001; Applicant: Singfish.com; mailed Apr. 18, 2008 (2 pages).
International Search Report; International Patent Application No. PCT/US01/43303; filed Nov. 20, 2001; Applicant: Singfish.com; mailed May 15, 2002 (3 pages).
International Search Report; International Patent Application No. PCT/US01/43248; filed Nov. 20, 2001; Applicant: Singfish.com; mailed May 30, 2002 (2 pages).
Koster, "Robots in the Web: Threat or Treat?" Available at <http://www.robotstxt.org/wc/threat-or-treat.html>, Apr. 1995.
Mauldin, "Lycos: design choices in an Internet search service," IEEE Expert IEEE USA, vol. 12, No. 1, Jan. 1997, pp. 8-11, IEEE USA.
Podlipnig et al., "A Survey of Web Cache Replacement Strategies," ACM Computing Surveys, vol. 35, No. 4, Dec. 2003, pp. 374-398.
U.S. Appl. No. 60/208,954, filed May 31, 2000 (7 pages).
U.S. Appl. No. 60/221,750, filed Aug. 31, 2003 (112 pages).
Swain, "Searching for Multimedia on the World Wide Web," Cambridge Research Library, Technical Report Series, Mar. 1999 (14 pages).
Eric Rehm, Representing Internet Streaming Media Metadata Using MPEG-7 Multimedia Description Schemes, 2000, ACM Press, pp. 93-98.
Eric Rehm, Representing Internet Streaming Media Metadata Using MPEG-7 Multimedia Description Schemes, Jul. 2, 2000, pp. 1-14.
Network Working Group, Dublin Core Metadata for Resource Discovery, Sep. 1998, pp. 1-10.
Taalee Semantic Engine Brochure (23 pages).
Eberman, et al., Compaq, Indexing Multimedia for the Internet, Cambridge Research Laboratory, Mar. 1999.
Kontothanassis, et al., Compaq, Design, Implementation, and Analysis of a Multimedia Indexing and Delivery Server, Cambridge Research Laboratory, Aug. 1999.
John R. Smith & Shih-Fu Chang, Visually Searching the Web for Content, Jul.-Sep. 1997, pp. 12-20.
Anne J. Gilliand-Swetland, Introduction to Metadata Setting the Stage, Jul. 5, 2000, pp. 1-11.

Max Chittister, Oracle InterMedia Annotator User's Guide, Release 1.5, 1999, 2000 Oracle Corporation.
"Rapidly Expanding Graphics Environment," NIKKEI Byte, Jun. 1, 1995, No. 139, pp. 244-256 (2 pages).
"Section 2 Platform," NIKKEI Byte, Feb. 1, 1994, No. 122, pp. 122-134 (2 pages).
Akanuma, T., "Power-up of Internet Browser," Touch PC, Oct. 24, 2000, vol. 5, No. 10, pp. 50-57.
European Office Action dated Jan. 31, 2007 in European Patent App. No. 01 989 347.8-2201, corresponding to PCT Application PCT/US01/51227 (5 pages).
European Office Action dated Oct. 24, 2006 in European Patent App. No. 01 989 326.2, corresponding to PCT Application PCT/US01/51227 (5 pages).
European Office Action dated Aug. 17, 2006 in European Patent App. No. 01 989 326.2-2201, corresponding to PCT Application PCT/US01/51227 (3 pages).
European Office Action dated Mar. 27, 2006 in European Patent App. No. 01 989 347.8, corresponding to PCT Application PCT/US01/51373 (3 pages).
International Search Report and Written Opinion; International Patent Application No. PCT/US01/51228; filed Oct. 24, 2001; Applicant: Singingfish.com (2 pages).
International Search Report; International Patent Application No. PCT/US01/51373; filed Oct. 24, 2001; Applicant: Singingfish.com; mailed Jul. 11, 2002 (5 pages).
Official Action for Japanese Patent Application No. 2002-557111, mailed Oct. 29, 2007 (1 page).
Office Action for Korean Application No. 10-2003-7005382, corresponding to PCT App. No. US01/51373, mailed Dec. 7, 2007 (5 pages).
Official Action for Japanese Patent Application No. 2002-549056, mailed Mar. 3, 2008 (1 page).
Official Action for Japanese Patent Application No. 2002-557111, mailed Apr. 9, 2007 (1 page).
U.S. Non-Final Office Action dated Jun. 21, 2007, U.S. Appl. No. 10/415,210 (13 pages).
U.S. Non-Final Office Action dated Nov. 4, 2008, U.S. Appl. No. 10/415,216 (20 pages).
U.S. Non-Final Office Action dated Jan. 3, 2012, U.S. Appl. No. 12/943,724 (12 pages).
U.S. Non-Final Office Action dated Jul. 26, 2012, U.S. Appl. No. 13/399,602 (7 pages).
U.S. Final Office Action dated Dec. 31, 2012, U.S. Appl. No. 13/699,602 (13 pages).
U.S. Non-Final Office Action dated Sep. 1, 2009, U.S. Appl. No. 11/173,799 (30 pages).
U.S. Final Office Action dated Apr. 1, 2010, U.S. Appl. No. 11/173,799 (28 pages).
U.S. Non-Final Office Action dated Sep. 13, 2012, U.S. Appl. No. 11/173,799 (28 pages).
Adding Windows Media to Web Pages, Dec. 31, 2000, pp. 1-7, retrieved from http://msdn.microsoft.com/en-us/library/ms983583%28d=printer%29.aspx on Jun. 27, 2012.
Extended European Search Report in EPO App. No. 12 00 3558, Jul. 4, 2012 (6 pages).
Chinese Office Action, Chinese App. No. 200580029532.7, Jan. 6, 2012.
Leonidas Kontothanassis, Chris Joerg, Michael J. Swain, Brian Eberman, Rober A. Iannucci, "Design, Implementation, and Analysis of a Multimedia Indexing and Delivery Server," Aug. 1999, Cambridge Research Laboratory, pp. 1-24.
International Search Report and Written Opinion; International Patent Application No. PCT/US07/73453; Filed: Jul. 13, 2007; Applicant: AOL LLC; Mailed: Sep. 9, 2008; 8 pages.

* cited by examiner

| search terms | media type | advertiser | media address | message id |
|---|---|---|---|---|
| general | mpg | New Jersey Generals | www.mediaserve.net/nij/preseason.mpg | 3824921 |
| "General Motors" | avi | GMC | www.mediahost.com/gmc00083.avi | 9128314 |
| "General Motors" | wav | GMC | www.mediahost.com/gmc00012.wav | 9128315 | advertising message information table — 300

Figure 8:
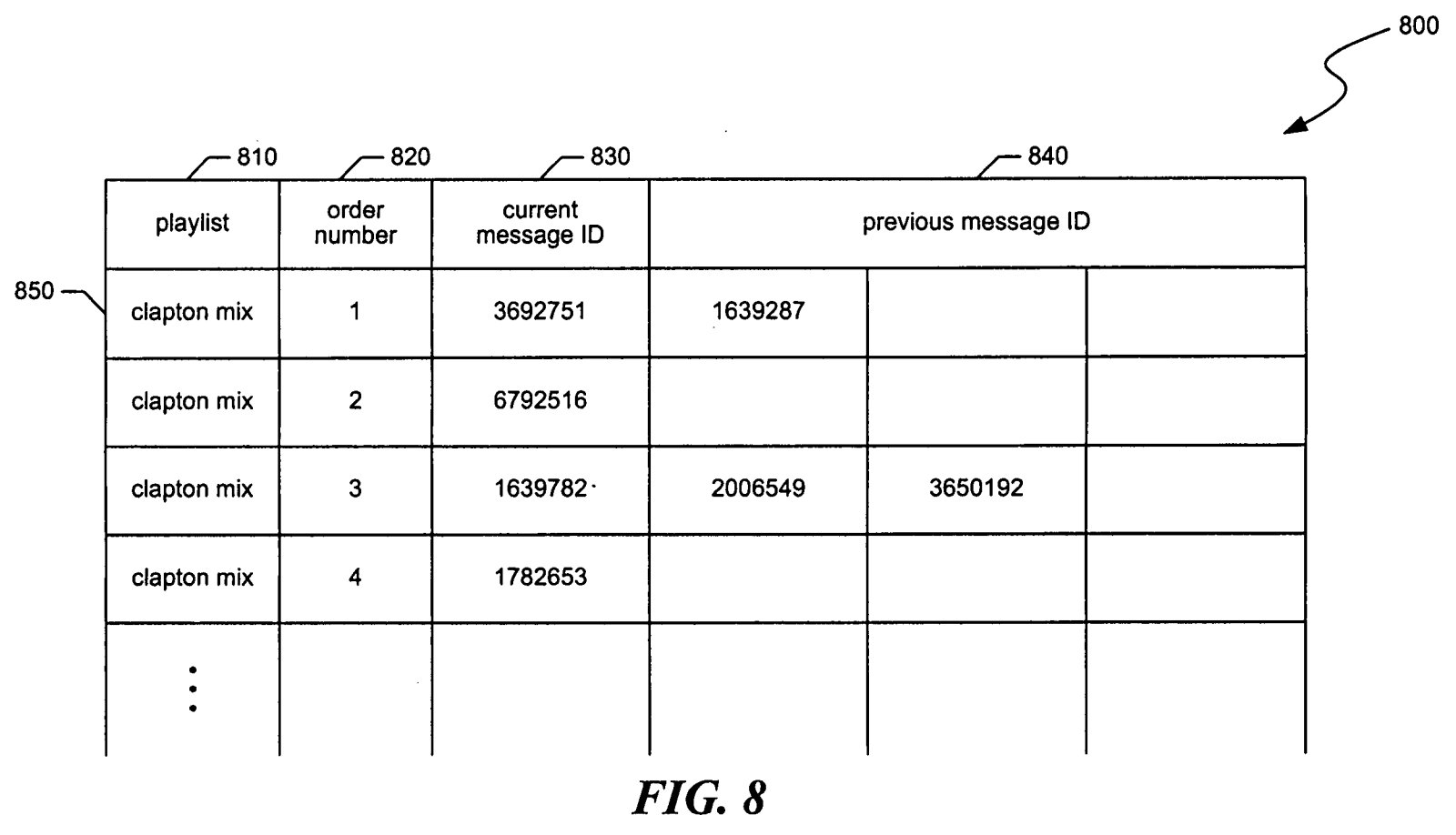

| playlist | order number | current message ID | previous message ID | |
|---|---|---|---|---|
| clapton mix | 1 | 3692751 | | |
| clapton mix | 2 | 6792516 | 1639287 | |
| clapton mix | 3 | 1639782 | | 3650192 |
| clapton mix | 4 | 1782653 | 2006549 | |
| ... | | | | |

TARGETED ADVERTISING FOR PLAYLISTS BASED UPON SEARCH QUERIES

TECHNICAL FIELD

The described technology is directed to the field of electronic advertising.

BACKGROUND

Media sequences of various kinds are available to users from various sources via the World Wide Web ("the web"). As examples, a user may access an audio sequence containing a song, a lecture, or a radio program; a video sequence containing a sports contest or silent-movie scene; or an audio/video sequence containing a movie, music video, television program, or news report.

Because the cost can be high for providing the storage and bandwidth resources needed to make media sequences available via the web, some media sequence providers sell advertising to be included in media sequences accessed via the web to defray these costs. In one common conventional approach, providers of media sequences select for each primary media sequence they make available an advertising message whose subject is similar to the subject of the primary media sequence, and whose media type is the same as the primary media sequence. For example, to a primary media sequence that is an audio/video news report about a hurricane in the Bahamas, the media sequence provider may attach an audio/video advertisement for a weather information service.

While this conventional approach may result in at least modest advertising revenue, it has the disadvantage that it causes the same advertising message to be shown to every user accessing the primary media sequence. Where the users accessing a particular primary media sequence have divergent interests, such "blanket" advertising may be less productive.

Accordingly, an approach that permitted advertising messages attached to media sequences to be more specifically targeted to the users accessing the video sequences would have significant utility.

BRIEF DESCRIPTION OF THE DRAWINGS

FIG. 3 is a data structure diagram showing sample contents of an advertising message information table used by the facility in some embodiments to select advertising messages based upon query contents.

FIG. 8 is a data structure diagram showing sample contents of a table representing advertising messages that are associated with media sequences in a playlist.

DETAILED DESCRIPTION

Figure 1:
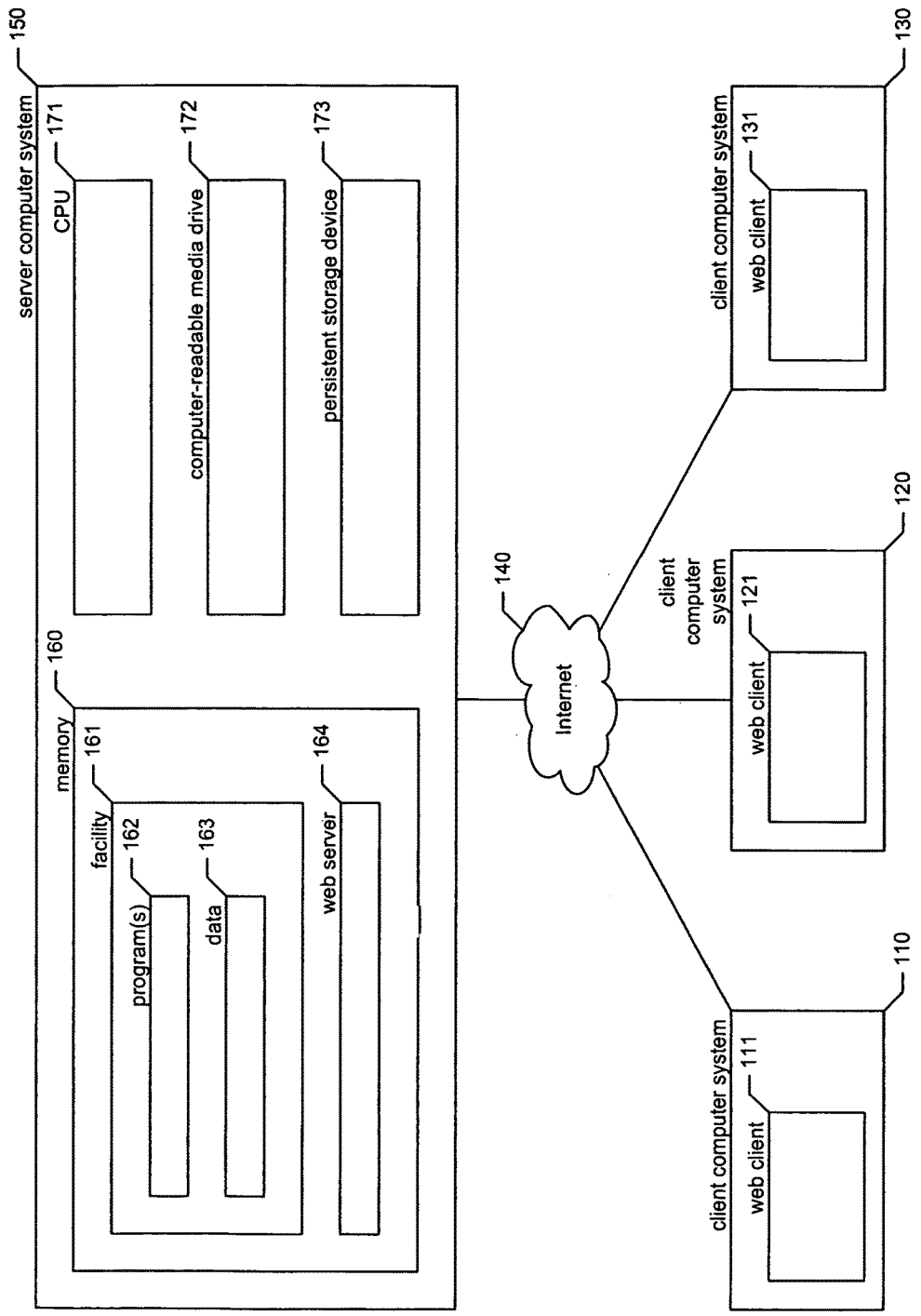
FIG. 1 is a high-level block diagram showing a typical environment in which the facility operates.

A software facility ("the facility") for selecting targeted advertising messages for deployment with media sequences or with playlists of media sequences is provided. The facility operates in connection with a multimedia search engine, such as the multimedia search engines described in U.S. patent application Ser. No. 09/878,866 filed Jun. 11, 2001; U.S. patent application Ser. No. 09/878,876 filed Jun. 11, 2001; U.S. patent application Ser. No. 09/876,941 filed Jun. 8, 2001; U.S. patent application Ser. No. 09/876,925 filed Jun. 8, 2001; U.S. patent application Ser. No. 10/432,316 filed May 21, 2003; U.S. patent application Ser. No. 10/432,258 filed May 21, 2003; U.S. patent application Ser. No. 10/432,306 filed May 21, 2003; U.S. patent application Ser. No. 10/432,388 filed May 21, 2003; U.S. patent application Ser. No. 10/415,021 filed Apr. 24, 2003; U.S. patent application Ser. No. 10/415,216 filed Apr. 24, 2003; and U.S. patent application Ser. No. 10/415,210 filed Apr. 24, 2003, each of which is hereby incorporated herein by reference in its entirety.

In some embodiments, when a user submits a query made up of search terms to a multimedia search engine, the query is used for two purposes: (1) to generate a search result containing controls such as links that can be used to download and/or render media sequences satisfying the query; and (2) to select one or more media sequence advertising messages to be deployed with the media sequences satisfying the query when downloaded and/or rendered. In various embodiments, the facility deploys the selected advertising messages in a variety of ways, including (1) inserting the advertising message into, or "attaching it to," the media sequences that satisfy the query, or (2) while a media sequence satisfying the query is being downloaded and/or rendered, displaying still image thumbnails of the selected advertising messages that the user may activate in order to view the selected advertising messages. For example, where a music video media sequence for the song Hollywood by the artist Madonna appears in the search result for the query "Madonna," the facility may insert an advertising message for Madonna's newest album into the music video or display thumbnail for such advertising message alongside the music video. On the other hand, when the music video appears in the search result for the query "Hollywood," the facility may instead deploy the music video with an advertising message for Hollywood tourist attractions. By selecting and deploying an advertising message with media sequences in some or all of the ways described above, the facility enables a media sequence provider to obtain additional revenue from presenting an advertising message likely to be relevant to the user performing the search.

In some embodiments, the facility also selects targeted advertising messages for deployment with sets of media sequences (hereinafter referred to as "playlists"). Playlists have become increasingly common on media sites as technology has allowed consumers and content producers to group various media sequences together based on common themes, interests, or other factors. Some media websites (such as Apple's iTunes) allow users to find pre-existing playlists by entering a search query to search for playlists that are generated by other users. Some media websites (such as AOL Music) allow users to create playlists by first entering a search query to locate a particular media sequence, then selecting a control that adds the media sequence into a personalized playlist. The facility stores search queries that are used by a user to locate pre-existing playlists, to generate new playlists, or to modify existing playlists. Prior to the use of a stored playlist, or contemporaneously with the use of a stored playlist, the facility uses the stored search queries to select one or more advertising messages to be presented with the media sequences in the playlist. The advertising messages that are presented may be updated each time the playlist is accessed in order to remove advertising messages from expired campaigns, to remove advertising messages that are not having a desired marketing effect, or to add new advertising messages. By providing targeted advertising messages to a playlist user, the facility enables a playlist publisher to increase the effectiveness of the advertisements over non-targeted ads.

FIG. 1 is a high-level block diagram showing a typical environment in which the facility operates. The block diagram shows several client computer systems, such as client computer systems 110, 120, and 130. Each of the client computer systems has a web client computer program that a user of the client computer system can use to browse the World Wide Web, such as web clients 111, 121, and 131. Such web clients typically allow their users to submit queries to multimedia search engines, and play media sequences listed in search results produced in response to those queries. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains the facility 161, comprising one or more programs 162, as well as data 163. Data 163 typically includes data relating single or multi-word search terms to advertising messages of one or more media sequence types. Such data may reflect the results of various kinds of advertising message sales techniques, such as auctions or outright purchase of particular search terms by advertisers or their representatives. The memory preferably further contains a web server computer program 164 for delivering web pages in response to requests from web clients. While items 161-164 are preferably stored in memory while being used, those skilled in the art will appreciate that these items, or portions of them, maybe be transferred between memory and a persistent storage device 172 for purposes of memory management and data integrity. The server computer system further contains one or more central processing units (CPU) 171 for executing programs, such as programs 161-164, and a computer-readable medium drive 173 for reading information or installing programs such as the facility from computer-readable media, such as a floppy disk, a CD-ROM, or a DVD.

While various embodiments of the facility are described in terms in the environment described above, those skilled in the art will appreciate that the facility may be implemented in a variety of other environments including a single, monolithic computer system, as well as various other combinations of computer systems or similar devices connected in various ways. In particular, the facility may interact with users via a wide range of portable and/or wireless user interface devices, such as cellular telephones, pagers, personal digital assistants, etc.

Figure 2:
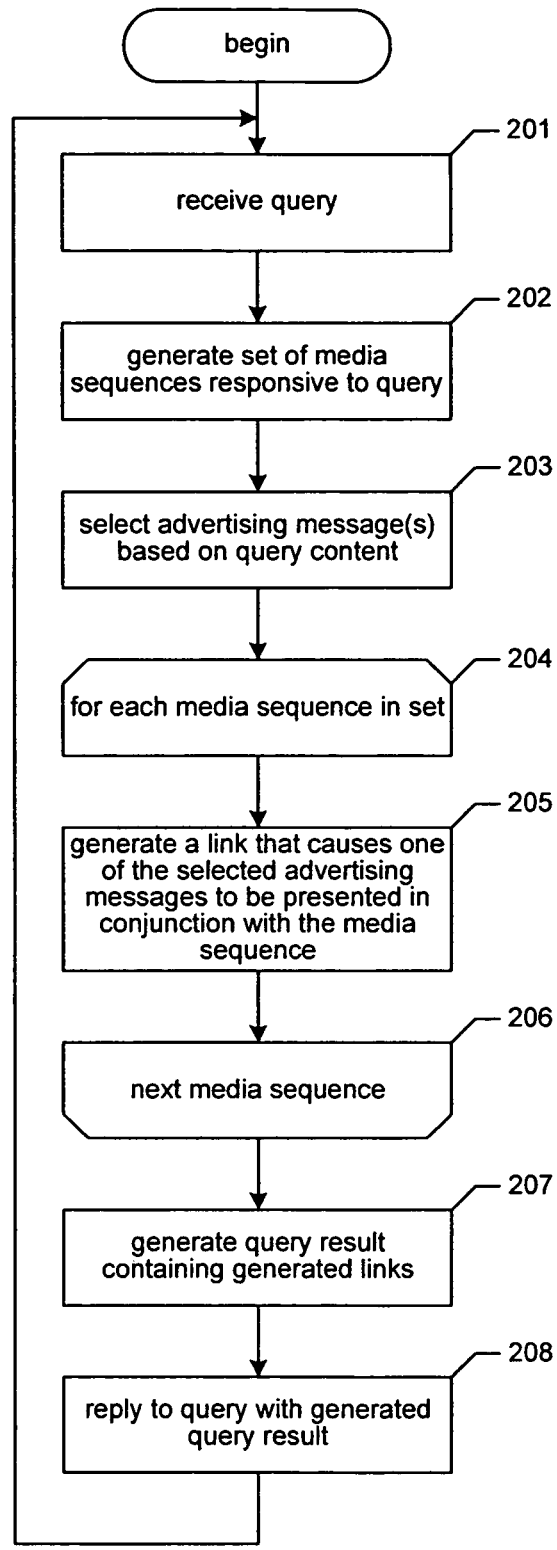
FIG. 2 is a flow diagram showing steps typically performed by the facility in order to process a query.

FIG. 2 is a flow diagram showing steps typically performed by the facility in order to process a query. In step 201, the facility receives the query. In step 202, the facility generates a set of media sequences that is responsive to the query. In some embodiments, the facility performs step 202 using multimedia search engine techniques described in one or more of the patent applications listed above. In step 203, the facility selects one or more advertising messages based upon the contents of the query. The selected advertising messages may include advertising messages of one or more media types, and/or media sequences relating to one or more different subjects associated with contents of the query.

FIG. 3 is a data structure diagram showing sample contents of an advertising message information table used by the facility in some embodiments to select advertising messages based upon query contents. The advertising message information table 300 is made up of rows, such as rows 301-303, each corresponding to a different combination of an advertising message with one or more search terms used to select the advertising message. Each row contains information in the following columns: a search terms column 311 containing one or more search terms associated with the advertising message; a media type column 312 indicating a media type of the advertising message; an advertiser column 313 containing identifying information for the advertiser on whose behalf the advertising message will be presented; a media address column 314 containing an address from which the advertising message media sequence may be retrieved; and a message id column 315 containing an identifier for the advertising message that may be used to maintain presentation statistics for the advertising message, bill the advertiser for presenting the advertising message, etc. For example, row 302 indicates that an avi advertising message for GMC having identifier 9128314 and available from media address www.mediahost.com/gmc0083.avi may be selected for attachment to media sequences included in a search result produced for a search query containing the search term "General Motors."

The facility typically identifies rows of the advertising message information table that in the search terms column contains search terms that match search terms in the query. In some cases, the facility further seeks to match the media type of selected advertising messages either directly to the media type of each of the principal media sequences, or to a group of media types that includes the media type of the principal media sequence, such as a group of audio/video media sequence media types, or a group of media sequence media types supported by a particular media viewer program, etc. In some embodiments, the facility selects the advertising messages associated with all rows of the advertising message information table whose search terms match the query. In some embodiments, the facility selects the advertising messages associated with the rows of the advertising message information table whose search terms most significantly match the query.

While FIG. 3 shows a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Returning to FIG. 2, in some embodiments, in step 203, the facility employs additional information to select advertising messages that are as relevant as possible to the user. Such additional information may include profile or preference information established for the user; metadata associated with one or more of the media sequences in the set generated in step 202; information provided by the advertiser or a designee of the advertiser; instructions to manually override the advertising messages selected for particular queries, query terms, resulting media sequences, or groups of resulting media sequences, such as those issued by the advertiser using campaign management software; etc.

In steps 204-206, the facility loops through each media sequence in the set generated in step 202. In step 205, the facility generates a link that causes one of the advertising messages selected in step 203 to be presented in conjunction with the media sequence when the link is dereferenced. This advertising message is generally of a media sequence type that is either the same as, or otherwise compatible with the media sequence type of the media sequence. The advertising message may be chosen based upon information associated with the media sequence, such as metadata attributed to the media sequence. In some cases, the generated link causes more than one of the selected advertising messages to be presented in conjunction with the media sequence.

In some embodiments, the facility generates the link in step 205 in a manner that causes the selected advertising message to be attached to the media sequence. The generated link may cause the selected advertising message to be presented in various positions relative to the media sequence, such as before the media sequence, after the media sequence, during the media sequence, or throughout the media sequence or portions of the media sequence. Table 1 below shows sample contents for a link generated by the facility in step 205.

TABLE 1 http://sponsoredvideo.aol.com/play?content=www.varchive.net/sloane_speech.avi?ad=www.mediahost.com/gmc00083.avi The portion of the sample link before the first question mark directs a request to a server capable of concatenating one or more advertising messages with a media sequence. The portion of the sample link between the first and second question marks identifies the media sequence to the server, while the portion after the second question mark identifies the advertising message to the server. When the server receives this request, it retrieves both the advertising message and the media sequence, concatenates them, and serves the concatenated result to the client. In some embodiments, the facility constructs the link in such a way as to direct the request to a server for the advertising message that is capable of retrieving and concatenating the media sequence, or a server for the media sequence that is capable of retrieving and concatenating the advertising message. In some embodiments, the facility encodes the contents of the link to make it more difficult or impossible to identify the URL of the advertising message and/or the media sequence without possession of data stored on the server. For example, as shown below in Table 2, the parameters containing the URLs for the media sequence in the advertising message may be replaced with numerical or other identifiers that are mapped to the corresponding URLs on the server.

TABLE 2 http://sponsoredvideo.aol.com/play?contentid=2306022&adid=9235255

In some embodiments, the facility encrypts the media sequence and advertising message parameters such that they can be decrypted using a key stored on the server, as shown below in Table 3.

TABLE 3 http://sponsoredvideo.aol.com/play?d098sdgds4o8sgdog84h4e4kjh

In some embodiments, the link is constructed to point to a custom media metafile, such as an .asx file, hosted by the facility. Sample contents for such an .asx file corresponding to the example shown in Table 1 are shown below in Table 4.

TABLE 4 ref1=www.mediahost.com/gmc00083.avi
ref2=www.varchive.net/sloane_speech.avi

In some embodiments, in step 205, the facility further causes visual information identifying a provider of the media sequence to be displayed, such as between the display of the media sequence and the display of the advertising message.

Figure 4:
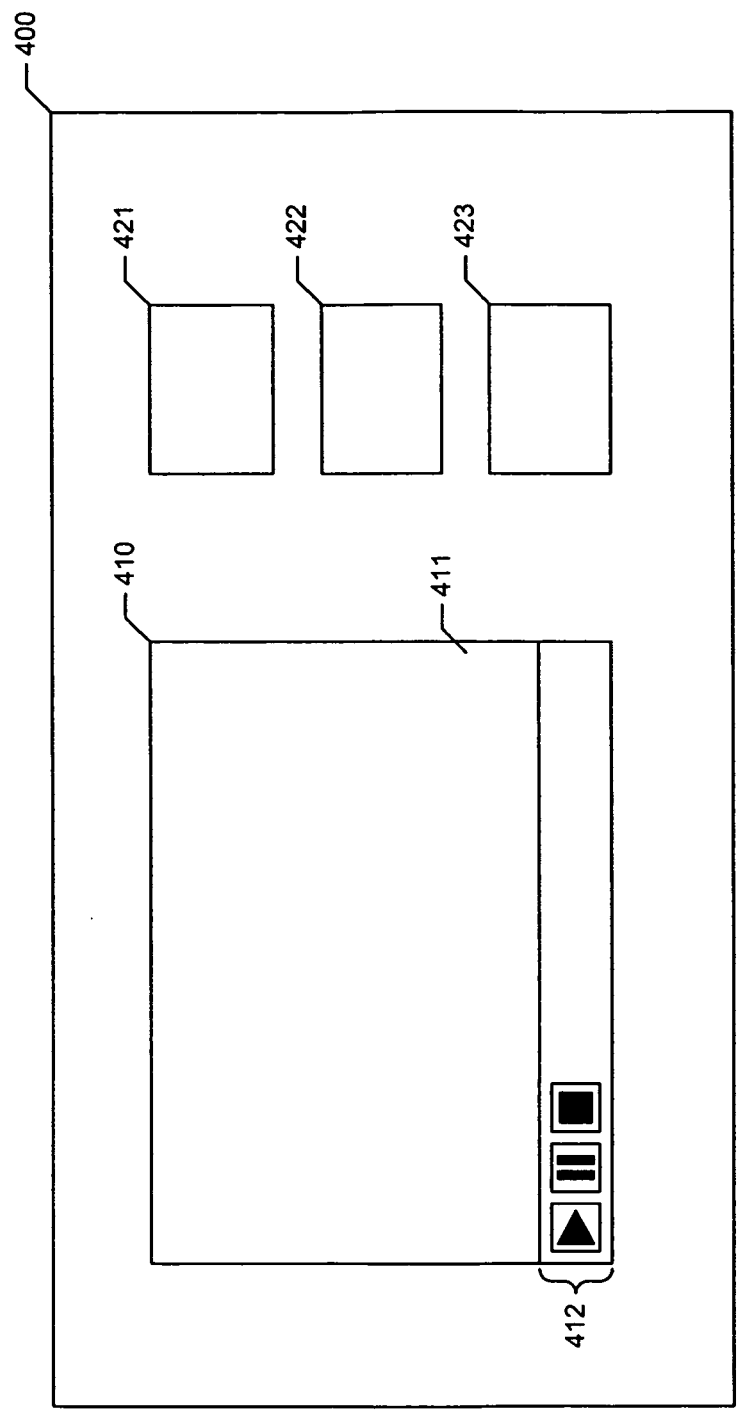
FIG. 4 is a display diagram showing sample contents of a display generated by the facility in which still images from selected advertising messages are displayed alongside the media sequence.

In some embodiments, the facility constructs the link in step 205 in such a way as to cause the client to display the media sequence with thumbnail still images for one or more selected advertising message alongside. FIG. 4 is a display diagram showing sample contents of a display generated by the facility in which still images from selected advertising messages are displayed alongside the media sequence. The diagram shows a page 400, such as a dynamically generated page, to which the link generated in step 205 points. The page includes an embedded media player 410, comprising a display pane 411 for displaying media sequences, as well as controls 412 for controlling the display of media sequences. When the page is loaded, the media sequence with which the link to the page is associated is played in the display pane 411 of the embedded media player. At the same time, advertising message thumbnails are displayed at thumbnail positions 421-423 near the embedded media player. The user can activate an advertising message thumbnail, such as by clicking it or hovering the mouse cursor over it. In response, the page displays the advertising message associated with the advertising message thumbnail. This advertising message may be displayed in a variety of locations, including in-place in its thumbnail position, in the embedded media player 410 in which the media sequence is displayed, or in a second embedded media player that is opened elsewhere in the page, such as in the portion of the page occupied by the thumbnail positions.

In step 206, if additional media sequences in the set remain to be processed, then the facility continues in step 204 to process the next media sequence in the set, else the facility continues in step 207. In step 207, the facility generates a query result containing the links generated in step 205. In step 208, the facility replies to the query received in step 201 with the query result generated in step 207. After step 208, the facility continues in step 201 to receive the next query.

Figure 5:
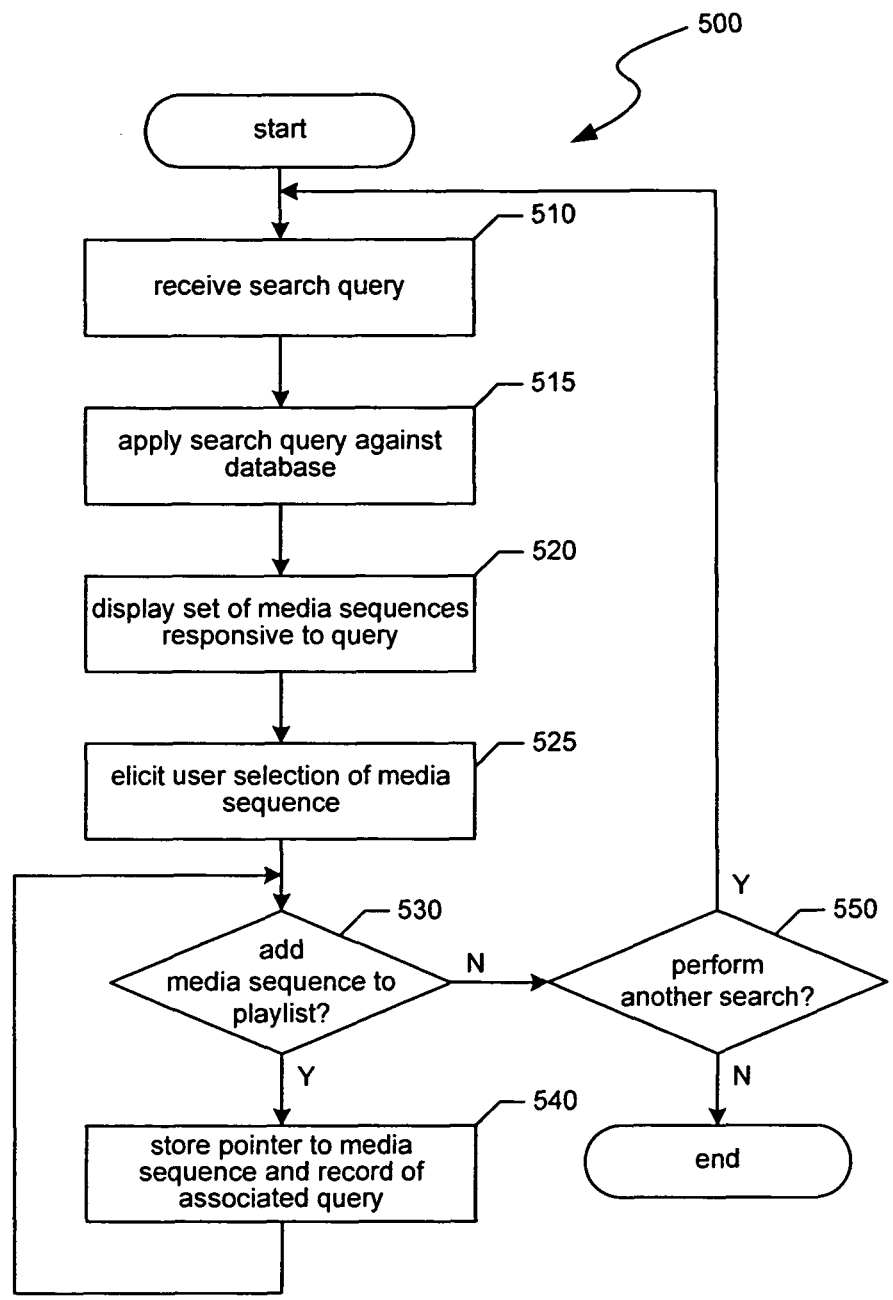
FIG. 5 is a flow diagram showing steps typically performed by the facility in order to create a playlist of media sequences.

In some embodiments, the facility also enables targeted advertising to be added to playlists containing multiple media sequences. FIG. 5 is a flow diagram of a process 500 by which the facility allows a user to construct a playlist of different media sequences. In step 510, the facility receives a search query entered by a user that pertains to a particular media sequence or a category of media sequences that the user is interested in locating. The search query is typically one or more keywords, for example, a user may enter a search query for "Clapton" or "blues guitar" or "Motherless Child." Those skilled in the art will appreciate that in addition to keywords, other input mechanisms such as pulldown menus or radio buttons may be used by a user to further specify the search query.

In step 515, the facility applies the search query against a database or other catalog of media sequences in order to identify a set of media sequences that are responsive to the query. In some embodiments, the facility performs the search using multimedia search engine techniques described in one or more of the patent applications referenced above. In step 520, the set of media sequences that are determined to be responsive to the search query are displayed by the facility. Typically, search results are displayed in a list with the results having highest relevancy displayed at the beginning of the list and results having lower relevancy displayed towards the end of the list. In step 525, the facility generates an interface that allows the user to select whether one or more media sequences from the search results should be added to an existing playlist or used to build a new playlist. Those skilled in the art will appreciate that the user may select particular media sequences from the search results list using a variety of different input mechanisms, including dragging and dropping a search result into a playlist, selecting a search result using a checkbox or radio button, selecting a search result using a drop-down menu, selecting a media sequence after being redirected to the sequence from the search results, or any of a variety of other techniques.

In a decision step 530, a test is made by the facility to see whether the user elected to add a media sequence identified in the search results to a playlist. If a media sequence is selected to be added to a playlist, in step 540 the facility stores a pointer or other link to the selected media sequence and also stores the search query that was used to generate the search results containing the selected media resource. A data structure suitable for storing such information is provided in FIG. 6.

Figure 6:
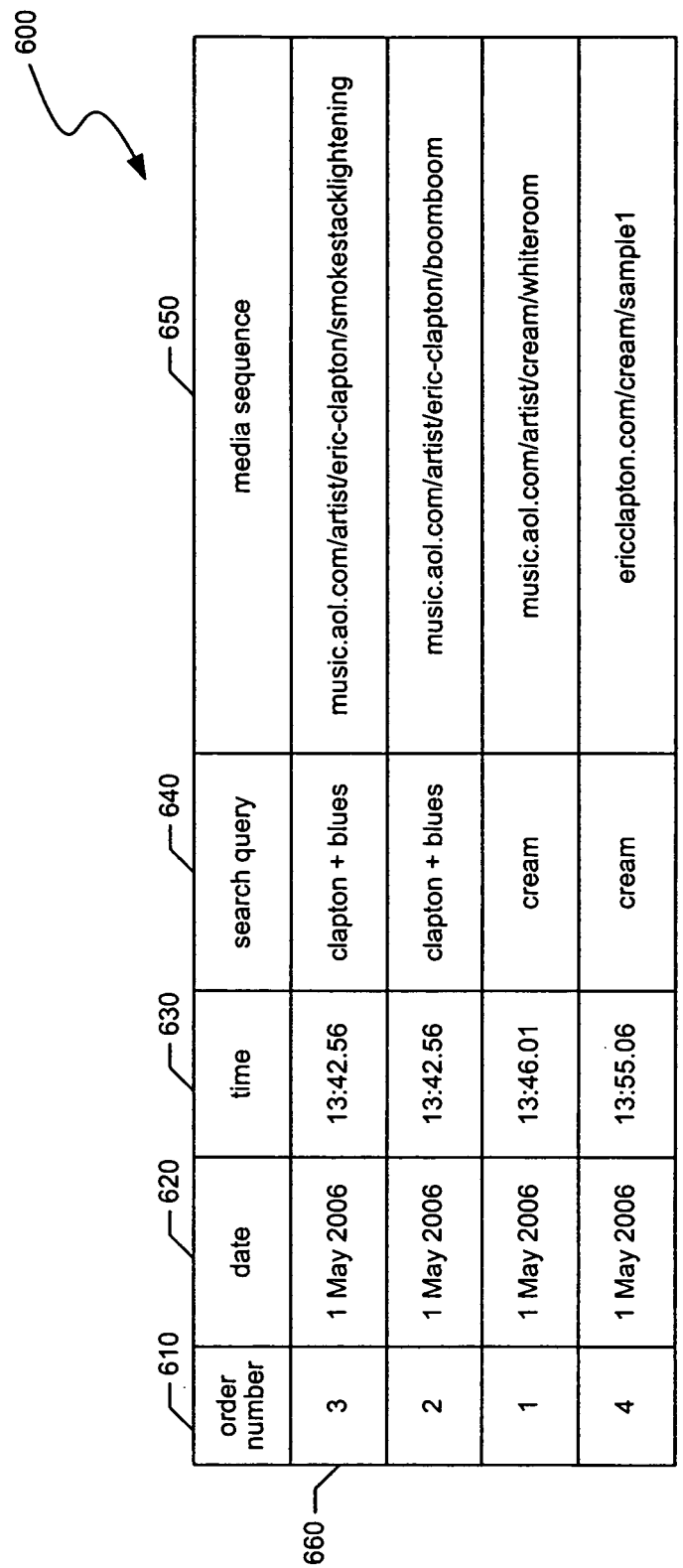
FIG. 6 is a data structure diagram showing sample contents of a table representing a playlist of media sequences.

FIG. 6 is a diagram of a representative data table 600 depicting the contents of a playlist of media sequences as maintained by the facility. Each row in table 600 corresponds to a different media sequence in a playlist. Each column in table 600 reflects a different field that is used to characterize the media sequences in the playlist. An order number field 610 identifies what numeric order (e.g. first, second, fifth, etc.) the media sequence appears in the playlist. A date field 620 and a time field 630 contains the date and time when a particular media sequence was added to the playlist. A search query field 640 contains a representation of the original search query that led to a user adding the media sequence to the playlist. The search query field may include the keywords entered by a user to identify the media sequence, as well as a characterization of any other settings that were used to generate the search results. A media sequence field 650 contains a pointer or other link to where the media sequence can be found, and may take the form of a uniform resource locator (URL) or other network location identifier. Examining a sample record 660 in table 600, the record reflects that the media sequence is the third sequence in the playlist (identified by an order number of "3"). The keywords used by a user in a search query to identify this media sequence were "Clapton" and "blues," and the particular search query was received on May 1, 2006, at 13:42.56. A URL is provided as a pointer to the media sequence, with the particular URL shown in record 660 linking to the Eric Clapton song "Smokestack Lightning" in a music section of the AOL website. Three additional records are provided in the table 600 to identify the remaining three media sequences in the playlist, but it will be appreciated that the playlist could be longer or shorter than the representative playlist that is depicted.

With reference to FIG. 6, a few observations may be made about the contents of the playlist table. In some situations, several media sequences in a playlist may share the same search query terms. For example, a user may select any number of media sequences for inclusion in a playlist based on the search results from a single query. As a result, two or more media sequences may have the same associated search query, such as the two media sequences in table 600 that were both identified from the search terms "Clapton" and "blues." In other situations, such as when the playlist is identified as a whole from a search query, all of the media sequences in the playlist may share the same search query terms. In still other situations, some of the media sequences in a playlist may be identified without the use of a search query. In these situations, such as when a media sequence is identified by browsing a catalog of media sequences, the search query field may be left blank or may contain keywords that correspond to a browse route that a user selected through a browse structure or browse tree to arrive at the media sequence. In yet other situations, each media sequence in a playlist may have a unique set of search query terms that are not shared with any other media sequences in the playlist.

It will be appreciated that the facility may create a separate table 600 for each playlist created or added to by a user, or may combine multiple playlists into a common table and provide an additional identifier (not shown) to correlate each media sequence with a particular playlist.

While FIG. 6 depicts a table whose contents and organization is designed to make it more comprehensible by a human reader, those skilled in the art will appreciate that the actual data structure used by the facility to store this information may differ from the table shown, in that it, for example, may be organized in a different manner, may contain more or less information than shown, may be compressed and/or encrypted, and may be optimized in a variety of ways.

Returning to FIG. 5, after a particular media sequence has been identified and the corresponding search query stored in a table by the facility in step 540, the facility returns to decision step 530. In decision step 530, the facility detects whether a user selected an additional media sequence from the list of search results that were responsive to the user's initial search query. Alternatively, if a user did not select any additional media sequences from the search results, the facility proceeds to a decision step 550 where the facility generates an interface that allows the user to elect to perform another search with a different search query. If a user elects to perform an additional search, the facility returns to step 510 and a new search is initiated. Alternatively, if a user elects not to perform an additional search, these steps conclude. It will be appreciated that the process flow diagram in FIG. 5 allows a user to construct a playlist by performing one or more searches and adding media sequences to the playlist from the results of those search queries. Playlists generated in such a fashion may be as short as two media sequences or as long as the facility is architected to support. Moreover, the facility may allow a user to subsequently add a media sequence to the playlist, delete a media sequence from the playlist, or modify the order of the media sequences in the playlist. Such addition, deletion, or modification may occur at any time after the initial construction of the playlist.

While the process depicted in FIG. 5 gives a user complete control over what media sequences appear in a playlist, other users may instead want to identify playlists created by third parties that are of interest to the user. In such a case, the facility allows a user to enter a search query that would characterize the entire list in some fashion. For example, a user may enter the query "Clapton Blues" in order to identify third party playlists that have already been constructed that contain blues works by Eric Clapton. In such an example, the facility may still create a table analogous to the table depicted in FIG. 6. Instead of different keywords being identified in the search query field 640, however, the same search query would be identified for all media sequences in the playlist. In this fashion, a playlist managed by the facility will typically have search queries associated with each media sequence in the playlist.

Figure 7:
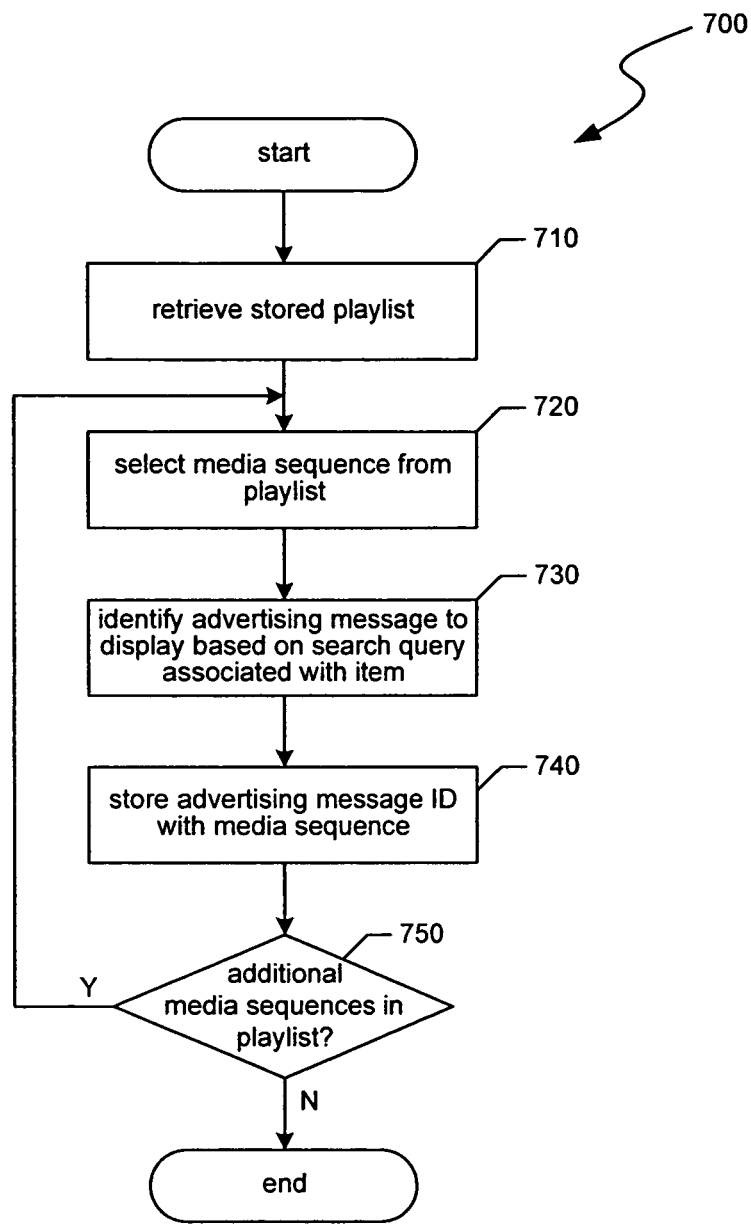
FIG. 7 is a flow diagram showing steps typically performed by the facility in order to identify advertising messages for display with a playlist.

Once search queries have been associated with a playlist, the facility may generate one or more targeted advertising messages that are associated with the playlist and which may be delivered to the user when the user accesses the playlist. FIG. 7 is a flow diagram depicting a process 700 typically performed by the facility in order to identify targeted advertising messages for delivery with a playlist. In step 710, the facility retrieves a stored playlist, such as the playlist represented in the table of FIG. 6. In step 720, the facility selects a particular media sequence from the playlist. In step 730, an advertising message is identified by the facility to deliver in conjunction with the media sequence. The advertising message may be identified using a variety of different techniques. As described above with respect to FIGS. 2 and 3, the search query that was initially used to identify the media sequence may be used by the facility to identify relevant advertising messages to deliver. Alternatively, or in addition to using the search query, the facility may target the advertising message based on knowledge of the user and/or of the associated media sequence.

When targeting advertising messages to media sequences contained in playlists, it will be appreciated that the search queries used to locate the media sequences or playlists may be used in a variety of ways. For example, if a single search query is associated with each media resource, each search query might only be used to target the advertising message associated with that particular media sequence. In this fashion, the ads will be tailored to user preferences at the media sequence level. Alternatively, all of the search queries associated with the media sequences in a particular playlist may be used as a group to target the advertising messages to the playlist. In this fashion, the advertising messages portrayed to the user will reflect advertising associated with the search queries as a whole, rather than as individual queries.

In step 740, a message ID identifying the advertising message is stored in association with the media sequence. FIG. 8 is a diagram of a representative data table 800 that associates media sequences with particular advertising message IDs. Each record in the table contains a playlist field 810, an order number field 820, a current message ID field 830, and a previous message ID field 840. The playlist field 810 identifies the playlist that a media sequence is associated with. In a sample record 850, the playlist has been identified by the text "Clapton mix." The order number field 820 is used by the facility to identify the particular media sequence based on the position of the sequence in the playlist. In record 850, the sequence is identified to be the first media sequence in the playlist. The current message ID field 830 stores a numeric identifier of an advertising message that is associated with the media sequence. As was described above, the message ID may be a unique number or any other identifier to correlate a particular advertising campaign or message with a media sequence. The previous message ID field 840 contains a list of previous advertising messages that have been correlated with this particular media sequence. As will be discussed in further detail below, such records may be used to ensure that a particular user is not presented with the same advertising message more often than is desired.

It will be appreciated that table 800 is merely representative of the type of correlation that may be drawn between advertising messages and media sequences in a playlist. A number of variations may be made to the mapping and to the table structure. More than one advertising message may be correlated with each media sequence, for example, allowing the facility to deliver one (or more) advertising message prior to the media sequence, one (or more) advertising message during the media sequence, and one (or more) advertising message after the media sequence. If more than one advertising message is correlated with each media sequence, the facility may also present a user with a choice of advertising messages to receive such as via the user display depicted in FIG. 4. Alternatively, rather than correlating a message ID with a single media sequence, the message ID may be correlated with two adjacent media sequences. For example, the message ID in the second media sequence record of table 800 may be identified by analyzing the search queries of both the second and third media sequences. The message ID therefore reflects the best targeted advertising message that can be delivered to a user as the user transitions from receiving the second media sequence to the third media sequence. Moreover, not all of the media sequences in the table may have an associated advertising message. Those skilled in the art will appreciate that other permutations are possible.

Returning to FIG. 7, after storing the advertising message ID with the media sequence in step 740, the facility proceeds to a decision step 750. In decision step 750, a test is made to determine whether there are additional media sequences in the playlist. If there are additional media sequences in the playlist, the facility returns to step 720 and additional advertising messages are identified for the remaining media sequences in the playlist. If there are no additional media sequences in the playlist, the facility terminates.

It will be appreciated that the targeting process of identifying which advertising messages to deliver with media sequences may be performed at various times prior to delivery of the actual advertising messages. For example, the targeting process may be performed when the user initially constructs a playlist or when the user locates a previously-generated playlist. An advantage of identifying advertising messages when the playlist is first generated or located is that the messages are immediately available for delivery whenever the user accesses the playlist in the future, without having to require further processing. Alternatively, the targeting process may be performed when the user accesses a playlist to review the media sequences in the playlist. Identifying advertising messages when a user accesses the playlist is obviously advantageous in that the advertising messages will be more up-to-date and potentially more relevant to a user. Further timing variations are possible. For example, a background process may periodically be run by the facility in order to update the advertising messages associated with a playlist on a periodic basis. Periodically updating the targeting may involve deleting advertising campaigns that have expired (i.e., are no longer actively run by the advertiser), inserting new advertising campaigns, and removing poorly performing advertising campaigns, as examples.

When the facility updates the advertising targeting and associates a new message with a particular media sequence, the facility may also store an indication of the previous advertising message that the new message is replacing. As shown in FIG. 8, message IDs associated with advertising messages that have already been shown to a user may be stored in the previous message ID field 840. For example, in record 850 the message ID "1639287" represents the advertising message that was delivered the previous time that the user accessed the playlist. Storing an indication of one or more previous messages allows the facility to ensure that advertising messages are not being repeated, or if repeated, only at a desired rate to a user. Alternatively, the previous message ID field 840 may be used as a field to maintain a running count (not shown) of the number of impressions of the current advertising message. Maintaining a count of the number of impressions allows the facility to update the advertising message only after a desired number of exposures to the user is achieved.

When a user accesses a playlist that has advertising messages correlated with media sequences, the advertising messages may be delivered before, during or after each media sequence, before or after each playlist as a whole, or any combination thereof. Even though advertising messages are correlated with a media sequence in the table, the facility may elect to not utilize one or more of the correlated messages when the media sequence is presented to the user. It will be appreciated that by using search queries to target advertisements to playlist users, better results are achieved than untargeted ads. Moreover, because playlists typically group together media sequences of a particular category or genre, better targeting will typically be achieved since a greater understanding of a user's interests may be predicted from search queries used to construct the playlist.

Those skilled in the art will appreciate that the steps shown in FIG. 2 may be altered in a variety of ways. For example, the order of the steps may be rearranged; substeps may be performed in parallel; shown steps may be omitted, or other steps may be included; etc.

In some embodiments, rather than deploying an advertising message with a primary media sequence by its construction of a link to the primary media sequence that is included in the search result, the facility instead includes either the advertising message itself or a link to the advertising message within a version of the primary media sequence that is served to the user who receives the search result. In these embodiments, where the user saves a copy of the served media sequence, the advertising message can be presented to the user each time the user plays the saved media sequence.

In some embodiments, rather than selecting an advertising message to deploy with a primary media sequence before generating the search result, the facility instead defers selection of an advertising message to deploy until after the user has selected the media sequence from the search result for retrieval. For example, the link to a media sequence included in the search result may include information usable by the facility to select an advertising message, such as search terms contained in the query. Table 5 below shows a link similar to the link of Table 2 in which the advertising message identifier parameter has been replaced with a parameter indicating the query string "general motors."

TABLE 5 http://sponsoredvideo.aol.com/play?contentid=2306022&query=general%20motors

Further, in some embodiments, the facility stores information inside the primary media sequence that causes a media player program playing the media sequence to call the facility for selection and deployment of an advertising message each time the media sequence is played. This "late-binding" of advertising messages can enable the facility to select even the most recently-introduced advertising messages. Indeed, it can cause advertising messages to be presented that are not available when the search result is generated, or even when the media sequence is served.

It will be appreciated by those skilled in the art that the above-described facility may be straightforwardly adapted or extended in various ways. For example, the facility may be used with media sequences and/or advertising messages of various media sequence types. Further, the facility may use a variety of mechanisms to attach advertising messages to media sequences. Additionally, the facility may attach advertising messages to media sequences made available in a variety of forms, such as streaming or downloaded forms. Also, the facility may be implemented in conjunction with a variety of other multimedia searching and/or advertising functionality. Further, the facility may be used by various combinations of parties, including advertisers, advertising agencies, electronic publishers, intermediaries of various types, etc. Advertising revenue may be collected from various combinations of these parties, and distributed to various combinations of these parties. While the foregoing description makes reference to preferred embodiments, the scope of the invention is defined solely by the claims that follow and the elements recited therein.

We claim:

1. A method in a computing system for presenting advertising messages, the method comprising: receiving free form user input, the free form user input comprising one or more search terms: identifying, with at least one processor, a playlist of digital media files based on the one or more search terms; generating, with the at least one processor, a uniform resource locator associated with the playlist of digital media files; identifying a plurality of advertising messages based in part on the one or more search terms; concatenating the playlist of digital media files with the plurality of advertising messages; and sending, in response to a selection of the uniform resource locator by the user, the concatenated playlist of digital media files and plurality of advertising messages to the user.

2. The method of claim 1, wherein the one or more search terms are used to locate individual digital media files that are contained in the playlist of digital media files.

3. The method of claim 1, wherein the one or more search terms are used to locate the playlist of digital media files.

4. The method of claim 1, wherein the plurality of advertising messages are identified by matching the one or more search terms with metadata terms associated with a catalog of advertising messages.

5. The method of claim 1, wherein the plurality of advertising messages are identified by comparing the one or more search terms with keywords associated with a catalog of advertising messages.

6. The method of claim 1, wherein the plurality of advertising messages are identified at the time that the selection of the uniform resource locator is received.

7. The method of claim 6, further comprising updating the plurality of advertising messages prior to sending the concatenated playlist of digital media files and plurality of advertising messages to the user by deleting those advertising messages that have expired in the plurality of advertising messages.

8. The method of claim 6, further comprising updating the plurality of advertising messages prior to sending the concatenated playlist of digital media files and plurality of advertising messages to the user by replacing those advertising messages that have expired in the plurality of advertising messages with new advertising messages.

9. The method of claim 1, wherein the plurality of advertising messages are identified at the time that the one or more search terms is received.

10. The method of claim 9, further comprising updating the plurality of advertising messages after sending the concatenated playlist of digital media files and plurality of advertising messages to the user so that a different plurality of advertising messages are concatenated with the playlist of digital media files.

11. The method of claim 1, further comprising updating the plurality of advertising messages after concatenating the playlist of digital media files with the plurality of advertising messages to the user so that a different plurality of advertising messages are concatenated with the playlist of digital media files.

12. The method of claim 11, wherein the plurality of advertising messages are updated by deleting those advertising messages that have expired in the plurality of advertising messages.

13. The method of claim 11, wherein the plurality of advertising messages are updated by replacing those advertising messages that have expired in the plurality of advertising messages with new advertising messages.

14. The method of claim 1, wherein two or more of the plurality of advertising messages are presented to a user in conjunction with a digital media file in the playlist of digital media files.

15. The method of claim 14, further comprising sending to the user a presentation of a portion of the contents of one of the two or more of the plurality of advertising messages.

16. The method of claim 15, further comprising: receiving a selection by the user of the portion of the plurality of advertising messages; and presenting the complete contents of an advertising message corresponding to the portion selected by the user.

17. A system for presenting advertising messages, the system comprising: a storage device comprising instructions and a catalog of advertising messages; and at least one processor that executes the stored instructions to:
identify two or more digital media files from a catalog of digital media files in response to free form user input, the free form user input comprising one or more search terms; generate a uniform resource locator associated with the two or more digital media files; identify from the catalog of advertising messages a plurality of advertising messages, the identification determined in part by the one or more search terms; and concatenate the two or more digital media files with the plurality of advertising messages.

18. The system of claim 17, wherein the one or more search terms are used to locate individual digital media files.

19. The system of claim 17, wherein the one or more search terms are used to locate user-generated playlists of digital media files.

20. The system of claim 17, wherein the plurality of advertising messages are identified by matching the one or more search terms with metadata terms associated with the catalog of advertising messages.

21. The system of claim 17, wherein the plurality of advertising messages are identified by comparing the one or more search terms with keywords associated with the catalog of advertising messages.

22. The system of claim 17, wherein the plurality of advertising messages are identified at the time that the two or more digital media files are identified.

23. The system of claim 17, wherein the plurality of advertising messages are identified prior to the time that the two or more digital media files are concatenated with the plurality of advertising messages.

24. The system of claim 17, wherein the plurality of advertising messages are identified at the time that the two or more digital media files are concatenated with the plurality of advertising messages.

25. The system of claim 17, wherein two or more of the plurality of advertising messages are presented to the user with a digital media file from the two or more digital media files.

26. The system of claim 25, wherein only a portion of one of the two or more of the plurality of advertising messages are presented.

27. The system of claim 26, further comprising a user interface that receives a selection from a user, wherein one of the two or more of the plurality of advertising messages is presented in its entirety to the user based on a received selection from the user.

28. A method of generating data signals collectively conveying a data structure of media resources with associated advertising messages, the method comprising: generating a playlist segment comprising an identification of a plurality of digital media files identified at least in part in response to free form user input, the free form user input comprising one or more search terms; generating a uniform resource locator associated with the playlist segment;
generating an advertising segment comprising an identification of a plurality of advertising messages, wherein the identity of the plurality of advertising messages is determined at least in part by the one or more search terms; and concatenating the plurality of digital media files with the plurality of advertising messages; wherein code implementing the method is stored in a non-transitory computer memory and is executed by a computer processor.

29. The method of claim 28, wherein the one or more search terms are used to locate individual digital media files in the plurality of digital media files.

30. The method of claim 28, wherein the one or more search terms are used to locate the plurality of digital media files as a group.

31. The method of claim 28, wherein the identity of the plurality of advertising messages is determined by matching the one or more search terms with metadata terms associated with a catalog of advertising messages.

32. The method of claim 28, wherein the identity of the plurality of advertising messages is determined by comparing the one or more search terms with keywords associated with a catalog of advertising messages.

33. The method of claim 1, wherein the uniform resource locator comprises a first portion identifying the playlist of digital media files.

34. The method of claim 33, wherein the uniform resource locator comprises a second portion identifying the plurality of advertising messages.

35. The method of claim 1, wherein the uniform resource locator identifies a dynamically generated web page comprising an embedded media player.

36. The method of claim 35, wherein the embedded media player renders the concatenated playlist of digital media files and plurality of advertising messages.

\* \* \* \* \*